United States Patent
Yazdanbod et al.

(10) Patent No.: US 12,515,172 B2
(45) Date of Patent: Jan. 6, 2026

(54) NON-GAS-EMITTING ELECTRODES FOR USE IN ELECTRODIALYSIS AND ELECTRODIONIZATION DESALINATION SYSTEMS

(71) Applicant: IONIC SOLUTIONS LTD., Rancho Mirage, CA (US)

(72) Inventors: Azaroghly Yazdanbod, Calgary (CA); Zahra Abooali Zadeh, Calgary (CA)

(73) Assignee: IONIC SOLUTIONS LTD., Rancho Mirage, CA (US)

( * ) Notice: Subject to any disclaimer, the term of this patent is extended or adjusted under 35 U.S.C. 154(b) by 0 days.

(21) Appl. No.: 18/129,402

(22) Filed: Mar. 31, 2023

(65) Prior Publication Data
US 2023/0311067 A1    Oct. 5, 2023

Related U.S. Application Data

(60) Provisional application No. 63/326,391, filed on Apr. 1, 2022.

(51) Int. Cl.
*B01D 61/52*     (2006.01)
*B01D 61/42*     (2006.01)
(Continued)

(52) U.S. Cl.
CPC ........... *B01D 61/52* (2013.01); *B01D 61/422* (2013.01); *B01D 61/48* (2013.01); *C23C 18/08* (2013.01);
(Continued)

(58) Field of Classification Search
CPC ........ B01D 61/42–61/56; C02F 1/469–1/4698
See application file for complete search history.

(56) References Cited

U.S. PATENT DOCUMENTS

| 10,329,174 B2 | 6/2019 | Yazdanbod |
| 10,604,426 B2 | 3/2020 | Connor, Jr. et al. |

(Continued)

FOREIGN PATENT DOCUMENTS

| CN | 101649477 B | 4/2011 |
| CN | 107017095 A | 8/2017 |

OTHER PUBLICATIONS

Sánchez-Polo ("Removal of bromide and iodide anions from drinking water by silver-activated carbon aerogels", Journal of Colloid and Interface Science, 300, 2006, 437-441) (Year: 2006).*

(Continued)

*Primary Examiner* — Alexander W Keeling
(74) *Attorney, Agent, or Firm* — Ronald J. Richter; Nesbitt IP LLC

(57) ABSTRACT

Non-gas emitting electrodes having a very high surface area, high electric capacitance, and low electric resistance are integrated with silver and/or silver chloride for use in electrodialysis/electrodeionization cells, or in any other system requiring the generation of electric fields through electrolyte solutions, and are capable of generating an electric field for extensive periods of time without generation of gases, and without the occurrence of water splitting electrode reactions. Each electrode is highly porous and highly conductive, such as a carbon aerogel electrode, and thus has a very large internal surface area, which is infused with silver and/or silver chloride. This combination supercapacitor and pseudocapacitor electrode can sustain electrode reactions for longer periods of time, and at much higher current densities, as compared to conventional (solid) silver/silver chloride electrodes.

5 Claims, 2 Drawing Sheets

(51) Int. Cl.
*B01D 61/48* (2006.01)
*C23C 18/08* (2006.01)
*C25D 3/46* (2006.01)
*C25D 7/00* (2006.01)

(52) U.S. Cl.
CPC ............. *C25D 3/46* (2013.01); *C25D 7/00* (2013.01); *B01D 2313/345* (2013.01)

(56) References Cited

U.S. PATENT DOCUMENTS

| | | | |
|---|---|---|---|
| 2007/0251827 A1* | 11/2007 | Park | B01D 39/2058 205/238 |
| 2011/0042219 A1 | 2/2011 | Wei et al. | |
| 2015/0166373 A1 | 6/2015 | Landon et al. | |
| 2015/0307373 A1* | 10/2015 | Alencherry | C02F 1/4604 264/105 |
| 2015/0357651 A1* | 12/2015 | Page | C02F 1/4693 429/499 |

OTHER PUBLICATIONS

Moreno-Castilla ("Group 6 metal oxide-carbon aerogels. Their synthesis, characterization and catalytic activity in the skeletal isomerization of 1-butene", Applied Catalysis A: General, 183 (1999) 345-356) (Year: 1999).*

International Search Report and Written Opinion dated Dec. 11, 2023, in International Application No. PCT/US2023/017084 filed Mar. 31, 2023 (12 pages).

Zhou et al., Dual-Ion Electrochemical Deionization System with Binder-Free Aerogel Electrodes, Small, 2019, pp. 1-8 (8 pages).

* cited by examiner

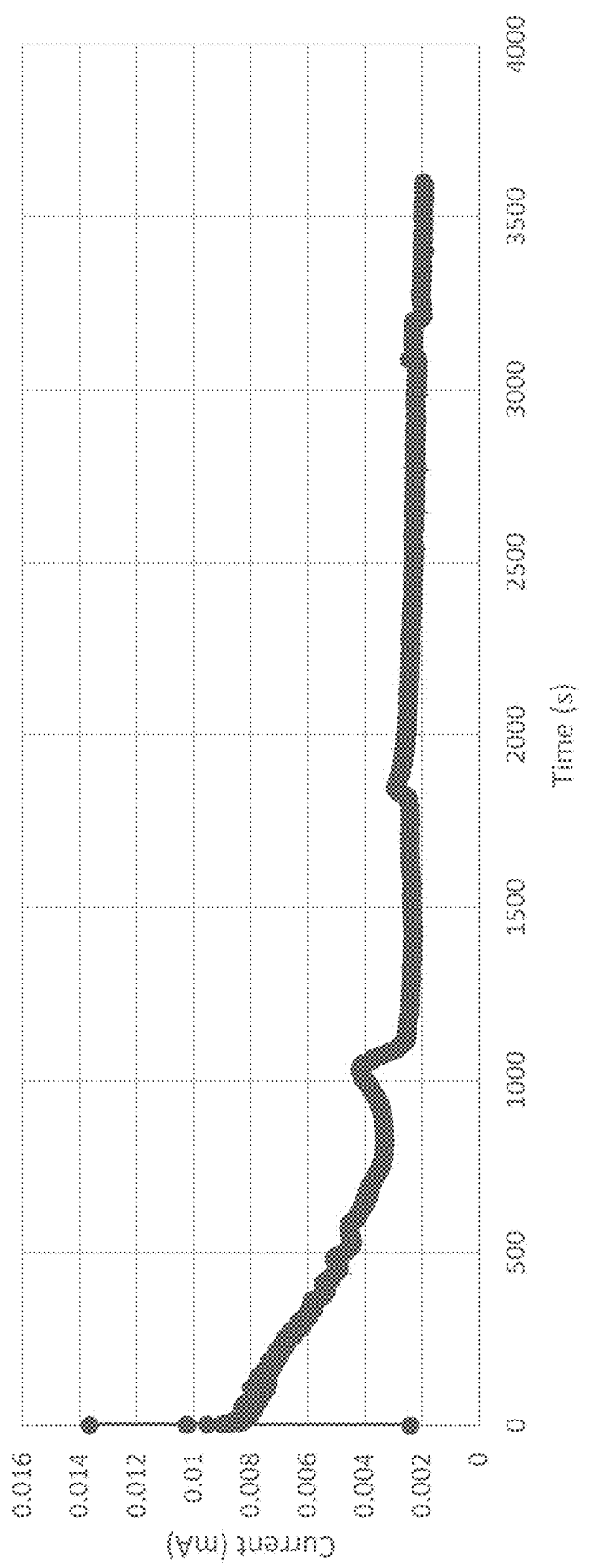
FIG. 1: Variation of current at constant voltage (0.5 volts) for electrodeposition of silver chloride on a silver electrode

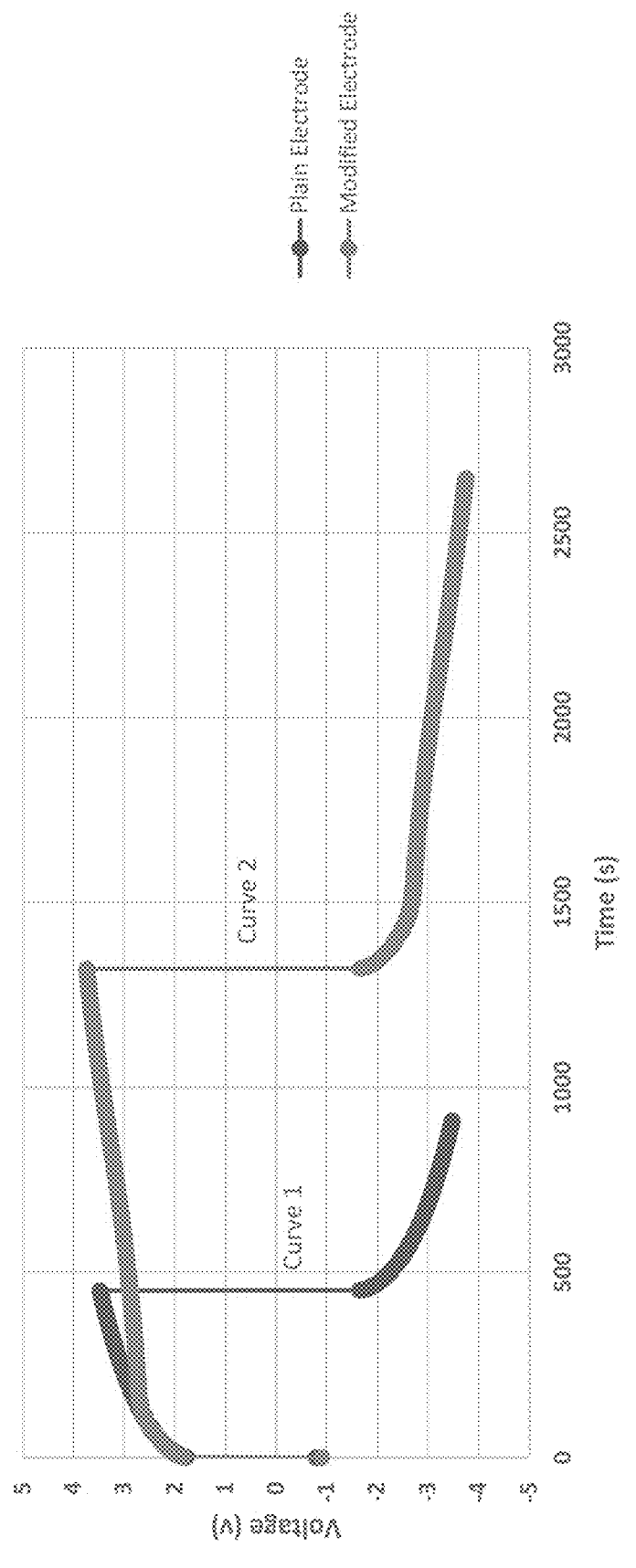

NON-GAS-EMITTING ELECTRODES FOR USE IN ELECTRODIALYSIS AND ELECTRODIONIZATION DESALINATION SYSTEMS

CROSS REFERENCES TO RELATED APPLICATION

The present application claims the benefit of U.S. Provisional Application No. 63/326,391 filed Apr. 1, 2022, the entire disclosure of which is hereby incorporated by reference.

FIELD OF THE INVENTION

The present invention relates in general to the generation of electric fields in electrodialysis and electrodeionization cells, and in particular to novel non-gas emitting electrodes for use in electrodialysis/electrodeionization cells to desalinate and purify water.

BACKGROUND OF THE INVENTION

Electrodialysis and electrodeionization devices are typically employed for removing dissolved ions from electrolyte solutions, and they operate by generating electric fields which pass through "feed" liquids such as seawater, wastewater, brackish water, hard water, and saltwater. Electrodialysis and electrodeionization devices can also be used for deionizing low conductivity waters and removing ionic contaminants from solutions.

Electrodeionization devices are typically used for production of higher purity products from higher purity feeds, while electrodialysis systems are used to produce water for such uses as human consumption from brackish waters and seawater. Further, electrodeionization systems typically incorporate specific voluminous spacers (or separators) placed between ion-selective membranes, while electrodialysis devices typically use rather thin spacers made of a plastic mesh. Such spacers, as they apply to the present invention and electrodeionization devices, are typically filled with electroactive media such as ion exchange resin beads, which facilitate ion flow in the low conductivity input and sparingly conductive high purity output product which is generated in the dilute compartments. Further, while electrodialysis systems are typically used for input solutions having 1000 mg/liter and higher salt content, such as brackish water and seawater, electrodeionization systems typically are used for input solutions already having a low salt content, such as aqueous salt solutions that are the product of passing through one or more reverse osmosis systems.

A typical electrodialysis/electrodeionization cell includes a series of diluted or "dilute" compartments alternating with concentrated or "concentrate" compartments, which are formed within the device by the action of a direct current (DC) electric field transversely passing through ion exchange membranes. The dilute and concentrate compartments are generated over time between the ion exchange membranes, as current passes through the solution. These multiple paired chambers are typically arranged into a configuration known in the art as the "stack", made of alternating anion-selective and cation-selective ion exchange membranes, separated from one another by spacers positioned between adjacent membranes. Spacers create working space between the ion exchange membranes, and provide proper fluid flow and hydrodynamics. Ions are accumulated in the concentrate compartments and removed from the dilute compartments.

Thus, electrodialysis/electrodeionization cells or systems generally include the combination of a stack, a pair of electrodes each housed in an endplate (each on one side of the stack), a DC power supply, and input and output fluid flow channels/passages. Following the endplates, each side of the stack typically has an "end spacer" which, together with the first ion selective membrane, helps isolate the solutions bathing the electrodes in the endplates from the stack feed, the product/dilute stream, and the concentrate stream. Alternatively, the electrodes housed in the endplates can be in contact with the feed solution. All of these components and their functions are well-known in the art, and are also described below.

In both electrodialysis and electrodeionization cells, the "input" or "feed" electrolyte solution is directed through specific flow channels, usually positioned in the endplates. These flow channels work in combination with flow passages in the ion selective membranes and spacers to enable the independent flow of liquids in the concentrate and dilute compartments. Ions present in the feed solution are subjected to an electric field, established through the stack by application of a DC electric potential difference between the electrodes. The passage of the DC current through the stack of alternating anion-selective and cation-selective membranes results in the formation of the alternating dilute and concentrate compartments, with ions being depleted from the liquid flowing through the dilute compartments and accumulated in the adjacent concentrate compartments.

The flow or conduction of ions in electrodialysis/electrodeionization stacks is governed by Ohms law ($I=V/R$). The electric current (I) of ions is directly proportional to the applied potential difference (voltage, V) and is inversely proportional to the electric resistance (R). Since electrodeionization cells typically involve the production of sparingly conductive waters and solutions such as high purity or ultrapure waters, the electric resistivity and resistance of these solutions is so high that the required voltages to establish a reasonable current can become quite excessive. Thus, typically electroactive media (ion exchange resins) are included in the spacers between the membranes to facilitate the flow of ions and define a low resistance path for flow of ions. The use of electroactive media such as ion exchange resins is generally not required in electrodialysis systems that treat high conductivity waters (such as brackish water or seawater) to produce potable water; rather, for these systems, the spacers are typically a mesh made up of woven strands of non-conductive materials such as plastics which allow for flow of water between the membranes. These spacers also typically have punched holes with specific gasketed edges for prevention of leaks to the outside of the stack and between the stack compartments that also allow the independent flow of feed water into and out of the diluting and the concentrating compartments, as is well known by the practitioners of this technology. Other functions of spacers in electrodialysis/electrodeionization systems include facilitation of the independent flow of the liquids in the dilute and concentrate compartments, structural support for the membranes, creation of volume and flow passages within each compartment, and maintenance of separation between adjacent anion-selective and cation-selective membranes.

Conventional electrodialysis/electrodeionization devices typically use conventional metallic electrodes for generation of the DC electric fields within the stack. In these electrodes, charges (electrons) are transferred across the metal-liquid interface. These electron transfers cause oxidation and/or reduction (redox) reactions to occur, depending on electrode polarity. Redox Reactions are governed by Faraday's law (i.e., the amount of chemical reaction products produced by the flow of current is proportional to the amount of electricity passed). Metallic electrodes thus establish electric fields within the solutions surrounding them via "Faradic/Redox" electrode reactions. If the potential difference between each electrode and the solution adjacent to it is less than the minimum potential to allow electrode reaction (charge exchange between the electrode and the ions in the solution adjacent to it) there will be no electric field between the electrodes, and no electric current will pass between the electrodes. Occurrence of Redox Reactions at metallic electrodes in water unavoidably also leads to generation of hydrogen gas at the cathode and oxygen gas at the anode. If the concentration of the chlorides in the solution adjacent to the anode is high, chlorine gas could also be generated.

In some electrodialysis devices the electrodes used are of the capacitive type, capable of absorbing large amounts of ions and capacitively establishing an electric field without the occurrence of electrode reactions. U.S. Pat. No. 10,329,174 to Yazdanbod, which is incorporated herein by reference in its entirety, specifically teaches the use of high electric capacitance electrodes such as electric double layer capacitor (EDLC) electrodes or supercapacitor electrodes, discusses the behavior of such high electric capacitance electrodes in confined containers, the use of high electric capacitance electrodes as means of capacitive generation of electric fields and ionic currents, and polarity reversals as a means of avoiding electrode reactions. The behavior of the stack and its function in creation of diluting and concentrating compartments is independent of how the electric field is generated. That is, the behavior and function of a given stack in response to the electric field passing through it is the same if the electric field is established by the use of metallic electrodes which function by occurrence of electrode Redox Reactions and generate gases or by capacitive electrodes which establish the electric field by absorption of ions, without electrode reactions.

The electrode plates of EDLC's typically incorporate porous carbon materials with high specific surface area and porosity, such as activated carbon, carbon aerogels or carbon aerogel composites. Carbon aerogel electrodes have three-dimensional porous networks which are promising materials for electrochemical energy storage applications, providing a very large surface area, a very high electric capacitance, and a very low electric resistance. The capacitances of carbon aerogel EDLC's are several orders of magnitudes larger than regular capacitors that use metallic plates and insulating dielectrics. The increase in the electric capacitance of EDLC electrodes is believed to be the result of the formation of electric double layers, which are specific concentrations of ions on and at very close proximity to each of the high surface area conductive capacitor plates. Thus, a charged EDLC electrode includes two "internal capacitors plates" where one capacitor plate is made up of a charged, conductive, high surface area plate and the other is made up of concentration of ions of opposite polarity as the charge on the high surface area plate. The high capacitances of EDLC electrodes are the result of extremely small separation between the charged capacitor plates of these internal capacitors.

EDLC electrodes have previously been employed in the electrodialysis and electrodeionization of salty waters (U.S. Pat. No. 10,329,174 to Yazdanbod). In order to avoid/prevent "Faradic/Redox" electrode reactions and the resultant electrode corrosion and pH/chemical changes in the electrode compartments solutions, the polarity of the applied potentials is reversed before the potential difference between the EDLC electrodes and their adjacent solution reaches a level that can cause such electrode reactions. This constitutes what is referred to as electrodialysis reversal (EDR). In EDR mode of operation of electrodialysis cells that is also practiced in electrodialysis cells using metallic electrodes, the compositions that might tend to form precipitates in the concentrating compartments are removed when as a result of polarity reversal the same compartments become diluting compartments.

In addition to using EDLC's, there are other electrodialysis/electrodeionization devices that generate the needed electric field with electrodes that utilize reversable electrochemical reactions with chloride. These types of electrodes fall into the category of "pseudocapacitive" electrodes, in which charge transfer between the electrodes and the solution adjacent to them occur through reversible Faradic reactions. A case in point is U.S. Pat. No. 10,604,426 to Connor, Jr., et al. titled "High efficiency electrochemical desalination system that incorporates participating electrodes". This patent teaches that when metallic electrodes made of material that reversibly reacts with chloride and is insoluble in water are used, the electric field within the stack can be generated without occurrence of water-splitting Redox Reactions. This patent utilizes the well-known reversible reaction of chlorides with silver, based on the following reactions at the anode and the cathode respectively.

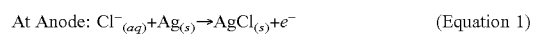

At Anode: $Cl^-_{(aq)} + Ag_{(s)} \rightarrow AgCl_{(s)} + e^-$ (Equation 1)

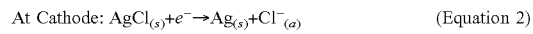

At Cathode: $AgCl_{(s)} + e^- \rightarrow Ag_{(s)} + Cl^-_{(a)}$ (Equation 2)

Based on the above reactions, which have been studied extensively with respect to silver chloride reference electrodes, when a DC potential is connected to the electrodes in this design, each aqueous chlorine ion attracted to the anode reacts with one atom of solid silver body of the electrode, forming one molecule of solid silver chloride and releasing one electron (see Equation 1). As noted in Equation 2, this electron then flows through the external circuit of the power supply and enters the cathode, where it reacts with the solid silver chloride cover of this electrode, forming one atom of solid silver element and releasing one aqueous chlorine ion. The standard electrode potential for these reversible reactions is reported in just about all standard electrode potential tables at about 0.230 volts+/−10 milli-volts.

As stated earlier, the consumption of chloride ions at the anode and the release of chlorine ions at the cathode are governed by Faraday's law, meaning that masses of these reaction products are proportional to one mole of each for 96,485 coulombs of charge. Consequently, as long as there is silver available and accessible at the anode, and silver chloride is available and accessible at the cathode, there are substantially no electrode reactions resulting in splitting of water at either the anode or the cathode, as the required electrode potential for these reactions (0.23 volts between the two electrodes) is below the minimum required electrode potential difference required for splitting of water (1.23 volts). Further, as depositing of silver chloride proceeds on the anode, progressively covering the silver cover/body of this electrode, higher voltages (more energy) are required to advance the related reaction or at a constant applied voltage the current drops. FIG. 1 demonstrates this by illustrating the drop in current between a hydrogen gas producing electrode, and a silver electrode submerged in a 10% hydrochloric acid solution. This figure shows that as silver chloride is formed on the surface of the silver electrode, the resistance of the cell increases and the current drops.

Silver/Silver chloride electrodes can also be used for electrodialysis reversal (EDR). In EDR cells, by reversing the polarity of the DC potential applied between the two electrodes, the previously anode electrode converts to a cathode electrode and the previously cathode electrode converts to an anode electrode reversing the direction of the electric field. This will result in the previously diluting compartments becoming concentrating compartments and the previously concentrating compartments becoming diluting compartments, as is well known to practitioners of this art. The EDR technique has many benefits, including removal of compositions that might tend to form precipitates in the concentrating compartments when the same compartments become diluting compartments. In order for the process of polarity reversal to be effective, the surface of the electrode previously functioning as the anode (and in reversal functioning as the cathode) should have sufficient amount of silver chloride deposited on it and the silver underlying the silver chloride covered electrode previously acting as cathode (and in reversal functioning as the anode) should have its silver cover sufficiently exposed to the solution to allow the related reactions to take place. These features and requirements demand that the cell operational time in each polarity setting would be highly regulated, and if one operational cycle is interrupted the process would start at the same setting with same current direction settings. Further, if the exact timing based on reactant availability in one or both electrodes is missed and the appropriate reactants would no longer be available, the required voltage for a given imposed current (current control mode of cell operation) would rise and water splitting Redox Reactions could occur and in addition to generation of gases, there would be pH changes induced within the solution adjacent to the electrodes that could damage and dissolve their silver chloride cover rendering the electrodes ineffective for their intended purpose of generating an electric field while avoiding water splitting Redox Reactions.

One important issue relating to the use of silver/silver chloride electrodes in reversible reactions involving chlorine is the limited reaction surface area of conventional electrodes, which limits their total charge capacity. These issues arise when the thickness of silver chloride material being deposited on an anode becomes too much for effective access of chlorine ions to the electrode's base silver cover. This undesirable effect also limits the use of high current densities when using these electrodes, since the reactants are depleted faster.

In light of the above, it can be appreciated that there is a need in the art for electrodes having a large surface area (i.e. EDLC electrodes) that can, in addition to their capability of capacitively absorbing large amounts of ions, simultaneously expose both silver and silver chloride to their adjacent solutions and facilitate reversible reactions at the anode and the cathode. It would also be beneficial if these reversible reactions can be continued as needed for a longer operational time in a one polarity setting. It would also be beneficial if these reversible reactions can be continued as needed for a longer operational time in the reversal setting, and at higher currents, in order to extend the time between polarity reversal and facilitating the design and use of more flexible EDR systems.

SUMMARY OF THE INVENTION

Accordingly, the present invention teaches electrodes having a very large surface area along with the availability of exposed silver and silver chloride surfaces for reversable reactions. The inventive electrodes can sustain low voltage reversible electrode reactions for longer operational periods of time, and at much higher current densities, as compared to conventional (solid) silver/silver chloride electrode.

A first aspect of the invention provides a non-gas-emitting electrode for use in generation of electric fields within electrodialysis and electrodeionization systems, the electrode comprising an Electric Double Layer Capacitor (EDLC) electrode infused with silver or silver chloride, wherein the electrode has the properties of a supercapacitor electrode with the reversibility of a pseudocapacitor electrode for generating an electric field for extensive periods of time without generation of gases, and without the occurrence of water splitting electrode reactions.

A second aspect of the invention provides a process for the manufacture of a non-gas-emitting electrode for electrodialysis and electrodeionization systems, the process comprising depositing silver or silver chloride within the structure of a carbon aerogel Electric Double Layer Capacitor (EDLC) electrode.

A third aspect of the invention provides an apparatus for desalinating and deionizing a feed solution, the apparatus comprising: a plurality of spaced apart ion exchange membranes arranged adjacent to one another with spacers in between forming a stack, each of the plurality of ion exchange membranes creating a concentrate compartment on one side and a dilute compartment on the other side when the apparatus is filled with a feed solution and acted upon by a direct current passing therethrough; a first non-gas-emitting electrode housed in a first endplate positioned on one side of the stack; a second non-gas-emitting electrode housed in a second endplate positioned on the other side of the stack; a first end spacer positioned between the first endplate and the first ion exchange membrane; a second end spacer positioned between the second endplate the last ion exchange membrane, wherein the stack is arranged between the first and second endplates; a frame for compressing and sealing together the first endplate, the second endplate, and the stack of ion exchange membranes; a plurality of input and output passages leading into and out of the endplates and each compartment; and a direct current electric power supply capable of polarity reversal for charging and establishing a potential difference between the first non-gas-emitting electrode and the second non-gas-emitting electrode to cause the passage of electric current through the feed solution.

The nature and advantages of the present invention will be more fully appreciated from the following drawings, detailed description, and claims.

BRIEF DESCRIPTION OF THE DRAWINGS

The accompanying drawing illustrates a preferred embodiment of the invention and, together with a general description of the invention given above, and the detailed description given below, serves to explain the principles of the invention.

FIG. 1 illustrates how current flow decreases over time at constant voltage when chlorine is electrochemically deposited on a silver electrode.

FIG. 2 illustrates the variation of the developed voltage over time between conventional EDLC electrodes and the electrodes of the present invention.

DETAILED DESCRIPTION OF THE INVENTION

Definitions—As defined herein, the terms "ion" or "ions" refer to atoms or molecules with a net electric charge due to the loss or gain of one or more electrons. In electrolytes, ions are hydrated ions which means that they are covered by a shell of water molecules. The amount of charge of an ion depends on the number of electrons lost or gained. For any ion missing or gaining one electron, the net charge is equal to that of an electron, which is equal to 1.60217662×10-19 Coulombs. This results in the fact that one mole of electrons is equivalent to Avogadro's number (6.02214×1023) of electrons or 96,485.3 Coulombs.

As used herein, the terms "electrolyte" and "electrolyte solution" are interchangeable when used in this document and are therefore applicable to any solute or chemically defined salt dissolved in any polar liquid, wherein the result is the formation of an electrolyte solution. Therefore, when referring to "ion-containing" or "salty" waters, irrespective of the number of salts present in unit volume of the liquid, it is to be interpreted as to mean and include an electrolyte solution. As such, the term "water" can mean any polar solvent and the term "salt" can mean any solute that together with a polar solvent forms an electrolyte solution.

As used herein the terms "ion exchange membranes" and "ion selective membranes" are interchangeable, and include cation exchange membranes, anion exchange membranes, cation selective membranes, and anion selective membranes.

As used herein the terms "electroactive media" and "ion exchange resin beads" are interchangeable and can include any shape or form which can perform the intended function of conducting ions in a sparingly conductive solution under the influence of an electric field, while maintaining sufficient mechanical integrity. Many types of electroactive media can be used to define a lower resistance path for ion flow. The most common type is in the form of ion exchange resin beads, but electroactive media can also be in the form of beads bonded to one another by a bonding agent, or in the form of fabrics, and depending on the specifics of a design could be mixed anion and cation exchange beads or singular polarity bead layers filling one compartment or distinct sections of both types of resin beads in a single compartment.

The terms "electrodeionization" and "electrodialysis" as used in this document are technically different, but similar in design and so can be referred to interchangeably herein as electrodialysis/electrodeionization cells or systems.

The present invention provides non-gas emitting electrodes for generation of electric fields within electrodialysis/electrodeionization cells. The electrodes can be used for desalinating and deionizing feed electrolytes, including but not limited to seawater, wastewater, brackish water, hard water and feed water used for the production of ultrapure water, and for processing of industrial electrolytes needing to be concentrated or diluted. The non-gas emitting electrodes combine supercapacitance with pseudocapacitance, as explained in detail herein.

Supercapacitors, or ultracapacitors, are generally divided into two types: (1) Electric Double Layer Capacitor electrodes, or EDLC's, which are supercapacitors which store charges electrostatically in a double layer (Helmholtz Layer); and (2) Pseudocapacitors, such as silver chloride electrodes, which store charges through reversible Faradic reactions. As noted above, EDLC's and their use have been described in the U.S. Pat. No. 10,329,174 to Yazdanbod, and pseudocapacitive electrodes benefitting from reversible silver-silver chloride reactions have been described in U.S. Pat. No. 10,604,426 to Connor, Jr., et al.

It has been discovered that the very large, porous, internal surface area of EDLC electrodes such as carbon aerogel electrodes can be covered or infused with silver and/or silver chloride, such that a substantial amount of silver and/or silver chloride can be made available to sustain electrode reactions for longer periods of time, and at much higher current densities, as compared to conventional (solid) silver/silver chloride electrodes. The inventive electrodes can combine the capacitances of EDLC's with the reversibility of pseudocapacitors, increasing their functionality as electrodes for use in electrodialysis and electrodeionization cells without the generation of gases or the occurrence of water splitting Redox Reactions.

Silver can be deposited within the structure of various types of carbon aerogel electrodes via the electrolysis of silver nitrate with a carbon aerogel EDLC electrode acting as the cathode, and using a silver, titanium, carbon or graphite anode. Another means for infusing a carbon aerogel EDLC electrode with silver is by saturating the electrode with a silver nitrate solution and then heating it to above the boiling/decomposition temperature of silver nitrate (440 to 550 degrees C.). At this temperature, silver nitrate decomposes and gives off nitrogen dioxide and oxygen gases, and leaves a finely dispersed deposit of silver within the structure of the electrode.

Silver chloride may also be placed within the structure of various types of carbon aerogel electrodes by saturating each with a silver nitrate solution. By placing these electrodes in such a solution, silver nitrate is dispersed within the aerogel's complex structure and pores. Placing this electrode in a solution of sodium chloride will then result in the precipitation of silver chloride within the structure of the electrode, according to the following reaction.

$$AgNO_{3(aq)} + NaCl_{(aq)} \rightarrow AgCl_{(s)} + NaNO_{3(aq)} \quad \text{(Equation 3)}$$

This can be done when the electrode is still saturated with silver nitrate solution, or preferably after partial or full drying of the electrode. Yet another method for deposition of the silver chloride within carbon aerogel electrodes is through the use of a carbon aerogel electrode having silver already deposited within it as anode, with hydrochloric acid solution as the solution, and any other electrode as the cathode in an electrochemical cell.

Although the abovementioned processes have been proven to be very effective in forming a dispersed collection of silver and silver chloride within carbon aerogel electrodes, it has been found by the inventors that during the manufacture of these electrodes the higher concentration of silver and silver chloride near the surface can lead to the formation of superficial layers of silver chloride on these electrodes, which may block the accessibility of silver and silver chloride to the electrolyte solution bathing the electrode body. This problem can be solved by rinsing the electrodes with water after their saturation with silver nitrate solution. This rinsing action, when combined with simple rubbing of the external electrode surfaces, has been found to eliminate the formation of a silver chloride layer in the subsequent electrode preparation steps for silver chloride electrodes, and the formation of the same when electrodes with infused silver deposits within them act as anodes.

The electrodes described herein are for use in electrodialysis/electrodeionization cells, or in any other system requiring the generation of electric fields through electrolyte solutions. The incorporation of silver and/or silver chloride in highly porous and conductive electrodes, such as carbon aerogel electrodes, the required electric field can be generated for extensive periods of time without generation of gases, and without the occurrence of water splitting Redox Reactions at these electrodes.

Equipment and Materials—in the tests described herein, the following equipment and materials were used: The power supply used was a Reference 3000 Potentiostat manufactured by GAMRY Instruments Inc. of Pennsylvania, USA. This device can supply up to 3.0 Amperes of current to each electrode and had a maximum active electrode voltage of +/−6.5 Volts. This device is classified as a high precision laboratory measurement tool.

The EDLC electrode used for infusion of silver and silver chloride as electrodes for generation of electric fields in electrodialysis cells under this invention were a 50 mm by 100 mm and 10 mm thick carbon aerogel-graphite composite electrode. These composites were prepared with the specific intention of allowing for the use of Resorcinol-Formaldehyde aerogels as the dominant phase in order to benefit from their high surface area, high electric capacitance and low electric resistance. Further and in order to avoid the complications and high cost associated with supercritical drying usually used to reduce the volume shrinkage associated with drying of such aerogels and aerogel composites, and in order to further enhance their electric conductivity, graphite powder filler material was incorporated into the mix. The graphite powder fill used was laboratory grade #38 commercially available from Fisher Scientific, Canada.

The typical composition of Resorcinol Formaldehyde (RF) aerogel base material used was 12.35 grams of resorcinol for 17.91 grams of 37% methane stabilized Formaldehyde in water solution and 8.7 grams of 25% solution of Cetyltrimethylammonium Chloride (CTAC) solution in water (all three lab grade purchased from Sigma Aldrich) which were mixed and stirred until the Resorcinol was totally dissolved. Then 1.5 grams of 0.4 Mole solution of sodium carbonate in water was added as catalyst.

The composite was then made using 50% by weight graphite powder detailed above and 50% aerogel base solution, also described above. The well mixed mixture of the two materials were then placed in a sealed steel mold 100 mm by 100 mm by 10 mm. The sealed mold was allowed to cure for about 24 hours at room temperature followed by 24 hours at 50 degrees Celsius (° C.) and 24 hours at 80° C., as is customary for RF aerogels. Once the mold was cool enough the components were taken out and soaked in acetone for 24 hours and then gradually dried in room temperature for 24 hrs and then heated up to 80° C. to remove the acetone and most of the remaining water. The components were placed in a refractory mould, covered with crushed activated carbon particles and were heated to 1100° C. This temperature was maintained for about 4 hours. After cooling to room temperature, the resulting parts were cut in half with a hand saw and were then used.

To infuse the silver and silver chloride into these electrodes, they were submerged in a 0.2 molar silver nitrate (more than 99% purity lab grade by ALPHACHEM) for 24 hours. The resulting electrodes were then rinsed with water and then dried at 110° C. Then one electrode was placed in 15000 ppm solution of sodium chloride to form silver chloride within the electrode, as described earlier. The other electrode was heated under a cover of activated carbon to over 500° C. to decompose the infused silver nitrate to nitrogen dioxide, oxygen and silver. This sample was also then placed in a 15000 ppm sodium chloride solution. For comparative tests, another set of similar electrodes were just placed in 15000 ppm sodium chloride solution after kilning at 1100° C.

Test 1—FIG. 1 presents the results of an electrochemical deposition test in which silver chloride was deposited onto a silver rod. In this test a 10 mm length of 3.14 mm in diameter pure silver rod (ROSS METALS, NY, NY) was exposed as the anode to a 10% hydrochloric acid solution (pH=0.84). The other electrode (cathode) in this cell was a graphite rod. The applied voltage using a GAMRY 3000 potentiostat was 0.5 volts operated in chrono amperometry mode. This figure shows that as chlorine was deposited on the silver electrode, the resistance of the cell increased as demonstrated by the drop in current. After the test the diameter of the 10 mm long rod was measured to be 3.17 mm. This test confirms that as silver chloride is deposited on the silver anode (according to Equation 1), its low conductivity increases cell resistance, as discussed earlier.

Test 2—included two experiments which evaluated the electric capacitance of a pair of plain carbon aerogel-graphite composite EDLC electrodes compared to a substantially identical carbon aerogel-graphite composite EDLC electrode pair that had been modified with silver/silver chloride according to the teachings of this invention. The test results are presented in FIG. 2, in which curve 1 and curve 2 both represent the variation of the developed voltage over time, when a constant current of 0.5 amps was passed between one electrode pair placed in a 15000 ppm sodium chloride solution measured using the potentiostat noted earlier.

The first pair of electrodes used were EDLC carbon aerogel-graphite composite electrodes prepared as described earlier with dimensions of 100 mm by 50 mm by 10 mm. The second curve represents the same for another pair of very similar electrodes that were prepared according to the teachings of this invention and after full kilning at a maximum temperature of about 1100 degrees C. Accordingly, the second set of electrodes was saturated with a 0.2 molar solution of silver nitrate by soaking in this solution for over 24 hours. Both these silver nitrate infused electrodes were then dried at 110 degrees C. One of these electrodes was then further heated to about 550 degrees C. for more than two hours to break down its infused silver nitrate into elemental silver and nitrogen dioxide and oxygen gases (which is assumed to have left the electrode). Both electrodes were then placed in 15000 ppm sodium chloride solution in a test cell. Placement of the silver infused electrode in 15000 ppm solution just infused it with sodium chloride while the same for the silver nitrate infused electrode resulted in the formation of silver chloride precipitate within the electrode according to the reaction noted in Equation 3. This second pair of electrodes were then subjected to a current of 0.5 Amps while measuring the developed voltage between them using the potentiostat identified earlier. The maximum voltage allowed to develop between the electrodes was limited to 0.8 volts above the base system voltage (the voltage developed at the instant the current was applied to the cell that indicates the required voltage to overcome the resistive component of the electric circuit used). This way the maximum voltage allowed to develop between the electrodes was below the minimum voltage required for water splitting. The test results clearly indicate a marked increase in electric capacitance of EDLC electrodes when manufactured and used in accordance with the teachings of this invention.

While the present invention has been illustrated by the description of the various embodiments and examples thereof, it is not intended to restrict or in any way limit the scope of the accompanying claims to such detail. Additional advantages and modifications will be readily apparent to those skilled in the art. Accordingly, departures may be made from such details without departing from the scope of the invention.

What is claimed is:

1. A pair of electrodes for use in generation of electric fields within electrodialysis and electrodeionization systems, each electrode of the electrode pair comprising a carbon aerogel electrode, wherein a deposit of silver is dispersed within the three-dimensional porous structure of the first electrode of the electrode pair, and wherein a deposit of silver chloride is dispersed within the three-dimensional porous structure of the second electrode of the electrode pair.

2. The electrode pair of claim 1, wherein the electrode material for each electrode of the electrode pair is a carbon aerogel composite.

3. The pair of electrodes of claim 1, wherein silver is dispersed within the three-dimensional porous structure of the first electrode according to a process which comprises the steps of:
   a) soaking the first electrode in a silver nitrate solution to saturate and infuse the first electrode with silver nitrate;
   b) rinsing the first electrode with water;
   c) drying the first electrode; and
   d) heating the first electrode to above the decomposition temperature of silver nitrate to break down the infused silver nitrate into elemental silver and nitrogen dioxide and oxygen gases, leaving a finely dispersed deposit of silver within the structure of the first electrode.

4. The pair of electrodes of claim 1, wherein silver chloride is dispersed within the three-dimensional porous structure of the second electrode according to a process which comprises the steps of:
   a) soaking the second electrode in a silver nitrate solution to saturate and infuse the second electrode with silver nitrate;
   b) rinsing the second electrode with water;
   c) drying the second electrode; and
   d) submerging the second electrode in a high concentration solution of sodium chloride, resulting in the precipitation of silver chloride within the structure of the second electrode.

5. The pair of electrodes of claim 1, wherein the pair is used in an apparatus for desalinating and deionizing a feed solution, wherein the apparatus comprises:
   a) a plurality of spaced apart ion exchange membranes arranged adjacent to one another with spacers in between forming a stack, each of the plurality of ion exchange membranes creating a concentrate compartment on one side and a dilute compartment on the other side when the apparatus is filled with a feed solution and acted upon by a direct current passing therethrough;
   b) the first electrode of the electrode pair housed in a first endplate positioned on one side of the stack;
   c) the second electrode of the electrode pair housed in a second endplate positioned on the other side of the stack;
   d) a first end spacer positioned between the first endplate and the first ion exchange membrane;
   e) a second end spacer positioned between the second endplate and the last ion exchange membrane, wherein the stack is arranged between the first and second endplates;
   f) a frame for compressing and sealing together the first endplate, the second endplate, and the stack of ion exchange membranes;
   g) a plurality of input and output passages leading into and out of the end plates and each compartment; and
   h) a direct current electric power supply capable of polarity reversal for charging and establishing a potential difference between the first electrode of the electrode pair and the second electrode of the electrode pair to cause the passage of electric current through the feed solution.

* * * * *